(12) United States Patent
Champie

(10) Patent No.: US 12,478,599 B2
(45) Date of Patent: Nov. 25, 2025

(54) NUTRACEUTICAL COMPOSITION COMPRISING C60 AND KETONE ESTERS

(71) Applicant: Max C. Champie, Buena Vista, CO (US)

(72) Inventor: Max C. Champie, Buena Vista, CO (US)

(73) Assignee: Max Champie, Buena Vista, CO (US)

( * ) Notice: Subject to any disclaimer, the term of this patent is extended or adjusted under 35 U.S.C. 154(b) by 1 day.

(21) Appl. No.: 17/880,495

(22) Filed: Aug. 3, 2022

(65) Prior Publication Data

US 2022/0370387 A1     Nov. 24, 2022

Related U.S. Application Data

(60) Division of application No. 16/565,104, filed on Sep. 9, 2019, now abandoned, which is a continuation-in-part of application No. 16/220,890, filed on Dec. 14, 2018, now Pat. No. 11,179,350.

(51) Int. Cl.
| | |
|---|---|
| *A61K 31/122* | (2006.01) |
| *A61K 31/194* | (2006.01) |
| *A61K 36/28* | (2006.01) |
| *A61K 36/71* | (2006.01) |
| *A61K 47/44* | (2017.01) |

(52) U.S. Cl.
CPC .......... *A61K 31/194* (2013.01); *A61K 31/122* (2013.01); *A61K 36/28* (2013.01); *A61K 36/71* (2013.01); *A61K 47/44* (2013.01)

(58) Field of Classification Search
CPC .. A61K 31/194; A61K 31/122; A61K 31/192; A61K 36/28; A61K 36/71; A61K 47/44
See application file for complete search history.

(56) References Cited

U.S. PATENT DOCUMENTS

| | | |
|---|---|---|
| 6,777,445 B2 | 8/2004 | Lei et al. |
| 7,163,956 B2 | 1/2007 | Wilson et al. |
| 10,239,839 B2 | 3/2019 | Kronholm et al. |
| 2003/0027870 A1* | 2/2003 | Wilson ................ A61K 31/05 514/732 |
| 2003/0065206 A1* | 4/2003 | Bolskar ............... C07C 69/753 558/87 |
| 2003/0162837 A1 | 8/2003 | Dugan et al. |
| 2014/0140985 A1* | 5/2014 | Moussa .................. A23L 3/358 424/125 |
| 2017/0258917 A1* | 9/2017 | Subbiah ................ A61K 47/44 |
| 2018/0008629 A1* | 1/2018 | Dixit ..................... A61K 9/1271 |

FOREIGN PATENT DOCUMENTS

| | | |
|---|---|---|
| CN | 106692189 A | 5/2017 |
| WO | 2013025180 | 2/2013 |

OTHER PUBLICATIONS

Liao et al., "Poly(3-hydroxybutyrate)/multi-walled carbon nanotubes nanocomposites: preparation and characterizations," Designed Monomers and Polymers vol. 16, No. 2, Mar. 2013, 99-107. (Year: 2013).*
Batti et al., "The prolongation of the lifespan of rats by repeated oral administration of [60] fullerene," Biomaterials 33(2012) 4936-4946).
V.V (Christyakov, et al.) "Possible Mechanisms of Fullerene C60 Antioxidant Action", BioMed Research International, vol. 2013, Article ID 821498, 4 pages.
(S.V. Prylutska, et al.) "Pristine C60 Fullerenes Inhibit The Rate of Tumor Growth and Metastasis", Experimental Oncology, Exp Oncol 2011, 33, 3, 162-164.
(Quick et al.) "A carboxyfullerene SOD mimetic improves cognition and extends the lifespan of mice" Neurobiology of Aging 29 (2008) 117-128).
(Weber, Robert J.) "Utilization of L(+)-3-Hydroxybutyrate, D(-)-3-Hydroxybutyrate, Acetoacetate, and Glucose for Respiration and Lipid Synthesis in the 18 Day-old rat" The Journal of Biological Chemistry, vol. 252, No. 15, Issue of Aug. 10, pp. 5222-5226, 1977.
Leone, Alessandro, "Moringa oleifera Seeds and Oil: Characteristics and Uses for Human Health" Int. J. Mol. Sci. 2016, 17(12), 1-14.
Gupta, Bhanushree, "Thymoquinone" Nutraceuticals, 2016, 1-9.
Hua, et al. "Cyclooxygenase-2 Regulates NLRP3 Inflammasome-Derived IL-1B Production." 27 pages.
Liao, et al. Poly(3-hydroxybutyrate)/multi-walled carbon nanotubes nanocomposites: preparation and characterizations. 10 pages.
Semenov et al.: "Carboxylated fullerenes: Physico-chemical properties and potential applications", Progress in Solid State Chemistry, Sep. 22, 2017, pp. 19-36, vol. 47-48, Elsevier Ltd.

* cited by examiner

*Primary Examiner* — Jared Barsky
(74) *Attorney, Agent, or Firm* — Fish IP Law, LLP

(57) ABSTRACT

An anti-oxidative, energy-boosting, and anti-aging nutraceutical composition containing fullerene substituted with functional groups, a medium chain triglyceride (preferably black seed oil), and the composition optionally includes one or more energy molecules not bound to the fullerene. Preferred functional groups and energy molecules include beta-hydroxybutyrate (more preferably D-beta-hydroxybutyrate) and carboxylic acids (e.g., caprylic acid and/or capric acid).

8 Claims, 3 Drawing Sheets

NUTRACEUTICAL COMPOSITION COMPRISING C60 AND KETONE ESTERS

CROSS-REFERENCE TO RELATED APPLICATIONS

This application is a divisional application of U.S. patent application Ser. No. 16/565,104, filed Sep. 9, 2019, which is a continuation in part of, U.S. Pat. No. 11,179,350, filed Dec. 14, 2018, which is incorporated herein by reference in its entirety.

FIELD OF THE INVENTION

The field of the invention is nutraceutical compositions, especially compositions containing fullerene.

BACKGROUND

The following description includes information that may be useful in understanding the present invention. It is not an admission that any of the information provided herein is prior art or relevant to the presently claimed invention, or that any publication specifically or implicitly referenced is prior art.

The human body is under constant attack from oxidative stress caused by free radicals from e.g., reactive oxygen species (ROS). Oxidative stress causes damage to cells, especially cellular protein and DNA, and is associated with many human diseases, including cancer, atherosclerosis, Alzheimer's disease, and Parkinson's disease. Oxidative stress also contributes to aging, which can be defined as a gradual accumulation of free-radical damage.

Buckminsterfullerene is a fullerene with the formula C60. It has a cage-like fused-ring structure (truncated icosahedron) that resembles a soccer ball, made of twenty hexagons and twelve pentagons, with a carbon atom at each vertex of each polygon and a bond along each polygon edge. Due to its 30 carbon double bonds, 60-carbon fullerene is a powerful and recyclable antioxidant that neutralizes harmful free radicals. It is reported to be 172 times more potent than Vitamin C, working as an electron reservoir to defuse reactive oxygen species (ROS) in the body, without altering its own structure.

A novel mechanism of antioxidant activity of buckminsterfullerene C60, based on protons absorbing and mild uncoupling of mitochondrial respiration and phosphorylation, was confirmed by computer modeling using Density Functional Theory. According to the model, Fullerene's geroprotective activity is significantly higher than those of the most powerful reactive oxygen species scavengers. C60 has an apparent ability to acquire positive charge by absorbing several protons, and this complex can then penetrate into mitochondria. Such a process allows for mild uncoupling of respiration and phosphorylation, which in turn leads to decrease in ROS production. See "Possible Mechanisms of Fullerene C60 Antioxidant Action," Chistyakov et al., BioMed Research International, vol. 2013, Article ID 821498, 4 pages, 2013.

Presumably due to its anti-oxidant and anti-aging properties, C60 and its derivatives have been shown to prolong life in a variety of species, including mice (Quick et al., "A carboxy-fullerene SOD mimetic improves cognition and extends the lifespan of mice" Neurobiology of Aging 29 (2008) 117-128) and rats (Baati et al., "The prolongation of the lifespan of rats by repeated oral administration of [60] fullerene," Biomaterials 33 (2012) 4936-4946). C60 fullerene was also shown to inhibit tumor growth and metastasis. See Prylutska et al., Pristine C60 Fullerenes Inhibit the Rate of Tumor Growth and Metastasis. Exp Oncol 2011, 33, 3, 162-164.

Beta-hydroxybutyrate (BHB), also known as 3-hydroxybutyric acid or 3-hydroxybutanoic acid (3HB), is the most abundant ketone bodies made by the body when it is burning fat instead of carbohydrates, accounting for 78% of total ketones in the blood. The other two ketones are acetoacetate (AcAc), making up around 20% of ketones in the blood, and acetone, making only about 2%. Although both BHB and acetone are derived from acetoacetate (AcAc), BHB is the main ketone used for energy because it's extremely stable and abundant, while acetone is lost through respiration and sweat. There are two types of BHB that made by the body: D-BHB and L-BHB. D-BHB is used for efficient energy production and is produced in high amounts; it is responsible for the anti-aging effects of total BHB. L-BHB is produced in lower quantities and can't be used for energy as efficiently as D-BHB; it is more helpful in the synthesis of fatty acids.

Previous work has used C60 or its derivatives for health benefits. For example, U.S. Patent Application Publication No.: US 2014/0140985, and PCT Publication No. WO 2013/025180, both by Moussa et al., teach using fullerene partially dissolved in a lipid carrier to prolong the life span in rats. U.S. Patent Application Publication No.: US 2003/0162837, by Dugan et al., teaches increasing a meta Zoan's lifespan by administering a carboxylated derivative of a C60 fullerene. U.S. Pat. No. 6,777,445 to Lei et al. teaches using fullerene to treat certain bacterial and viral infections. U.S. Pat. No. 7,163,956 to Wilson et al. and U.S. Pat. No. 10,239,839 to Kronholm et al teach using substituted fullerene composition as antioxidants and for radical scavenging.

However, none of these references teach using fullerene, especially buckminsterfullerene C60, substituted with BHB to improve the health, including anti-aging and increasing cellular energy levels.

Thus, there is a need for improved fullerene molecules that simultaneously address both reducing free radicals and improving energy production.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

Figure 1:
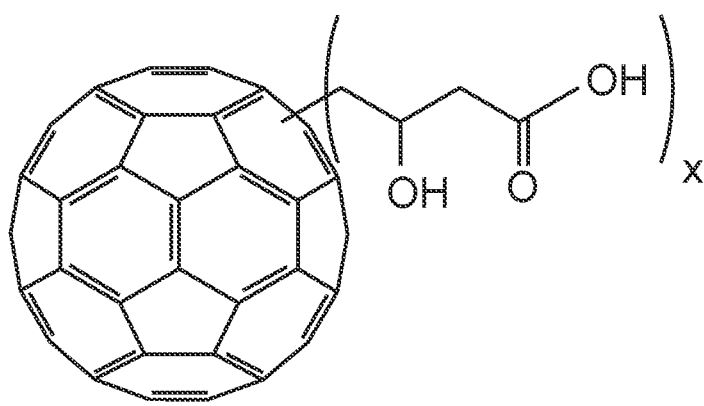
FIG. 1 shows an exemplary fullerene molecule substituted with one or more beta-hydroxybutyrate groups at any suitable position of the fullerene molecule.

The inventive subject matter provides apparatus, systems and methods in which fullerene (preferably buckminsterfullerene C60) is substituted with one or more beta-hydroxybutyrate (BHB) as energy molecules to conferring anti-aging and energy-boosting benefits.

Contemplated nutraceutical compositions include fullerene molecules substituted with one or more BHB molecules (e.g., two, three, four, five, six, etc.). For example, substituted buckminsterfullerene molecules have a formula of $C_{60}$—$(CH_2CHOHCH_2COOH)_n$. The BHB molecule can be either D-beta-hydroxybutyrate or L-beta-hydroxybutyrate, but preferably D-beta-hydroxybutyrate. In especially preferred embodiments, fullerene is saturated with substituted beta-hydroxybutyrate molecules. Additionally, fullerene can be further substituted with one or more carboxylic acid molecules, preferably C8 caprylic acid and/or C10 capric acid molecules.

Anecdotal evidence from human volunteers has demonstrated that the use of C60 (antioxidant) substituted with beta-hydroxybutyrate molecules (energy-boosting) has unexpected benefits in promoting health, including increasing energy levels, clearing free radicals, and the combined and synergistic effect in slowing aging, and in some cases, reversing aging.

It is contemplated that, in some embodiments, the nutraceutical composition uses a medium chain triglyceride as a carrier. Medium chain triglycerides are triglycerides with two or three fatty acids having an aliphatic tail of 6-12 carbon atoms. Those medium chain triglycerides with fatty acids having an aliphatic tail of 8 carbon atoms are preferred in the current inventive subject matter. Contemplated sources of the medium chain triglyceride include one or more of olive oil, black seed oil, corn oil, soy oil, coconut oil, avocado oil, or other vegetable oil. Oils derived from an animal can also be used, for example, fish oil.

In some embodiments, the nutraceutical composition contains an emulsifier. A plant base emulsifier is preferred, for example, lecithin. It is contemplated that sunflower seed can be the source of lecithin. It is further contemplated that some embodiments comprise free energy molecules not bound to the substituted fullerene. These energy molecules include beta-hydroxybutyrate, carboxylic acids (preferably C8 caprylic acid and/or C10 capric acid), or any combination thereof.

The inventive subject matter also provides a method of improving the health of a human by administering a therapeutically effective amount of the nutraceutical composition described above. Contemplated health benefits include improving longevity, protecting against free radicals, preventing and reducing inflammation, killing viruses, bacteria, fungus, and parasites, protecting nerves, preventing osteoarthritis, improving obesity and metabolic syndrome, preventing UV damage, stopping tremor, improving memory, increasing energy, lessening anxiety, improving focus, reducing wrinkles, and promoting a more youthful appearance.

In preferred embodiments, a person takes 3-6 dropper draws 2 times daily. Once substituted fullerene is saturated in the body (i.e., when homeostasis is reached), one can reduce the amount taken to just 1 teaspoon a day for maintenance. Some individuals have sensitive digestive systems and too much of an oil (olive, coconut, avocado, or especially black seed oil) can cause diarrhea. In such cases the individual should reduce the quantity taken or change to a different carrier oil. As used herein, a teaspoon is approximately 5 droppers full, or 5 ml. If working on a health issue, it is recommended that a person continue taking substituted fullerene at least twice a day until a difference is noticed. It is further contemplated that the nutraceutical composition can be used on pets or other animals.

DETAILED DESCRIPTION

Figure 1A:
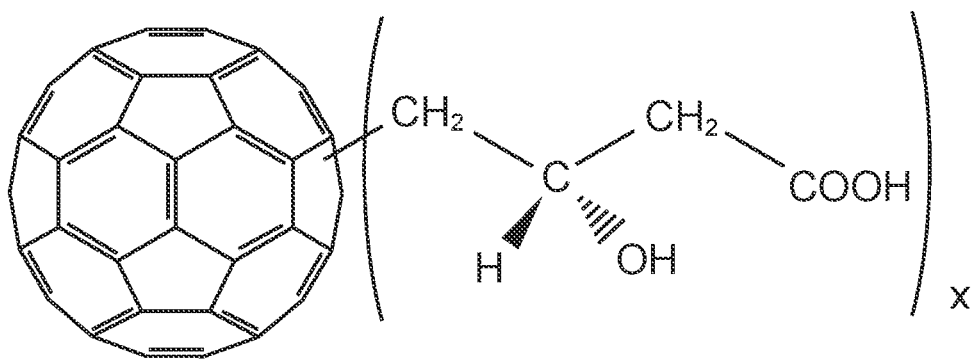
FIG. 1A shows the exemplary fullerene molecule in FIG. 1, substituted with one or more L-beta-hydroxybutyrate groups.
Figure 1B:
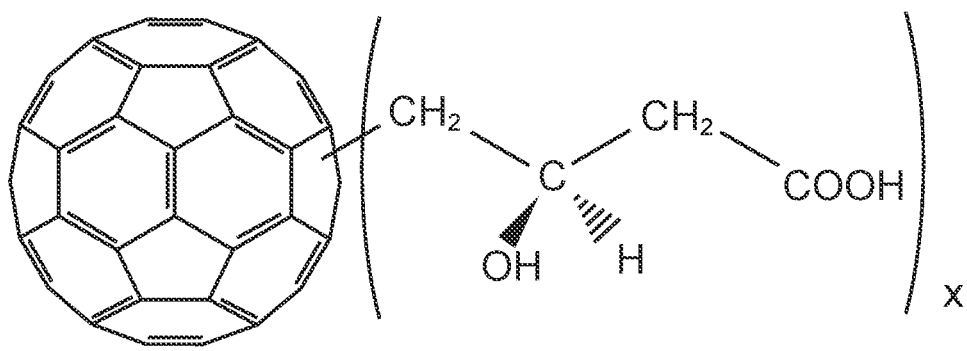
FIG. 1B shows the exemplary fullerene molecule in FIG. 1, substituted with one or more D-beta-hydroxybutyrate groups.

FIG. 1 shows an exemplary C60 fullerene molecule substituted with (x) number of beta-hydroxybutyrate groups, where the value of (x) can be anywhere between 1 and the maximum number that can be substituted on the fullerene molecule. The substitution can take place at any suitable position of the fullerene molecule. FIG. 1A shows the exemplary fullerene molecule in FIG. 1, substituted with one or more L-beta-hydroxybutyrate groups. FIG. 1B shows the exemplary fullerene molecule in FIG. 1, substituted with one or more D-beta-hydroxybutyrate groups.

Figure 2:
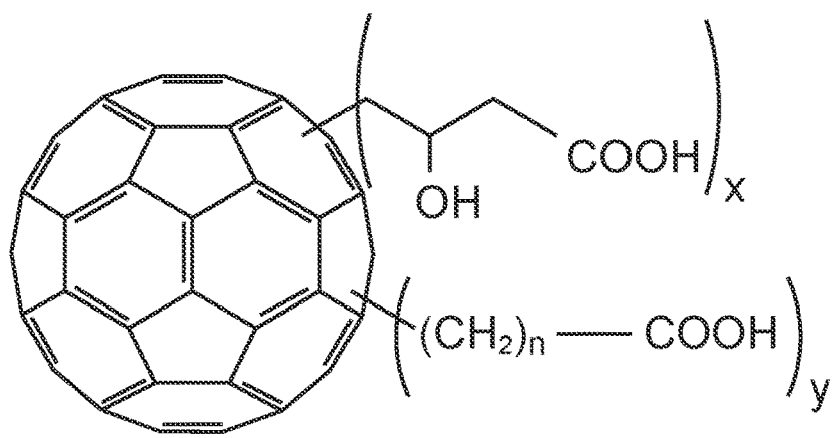
FIG. 2 shows an exemplary fullerene molecule substituted with one or more beta-hydroxybutyrate groups and one or more carboxylic acids at any suitable position of the fullerene molecule.
Figure 2A:
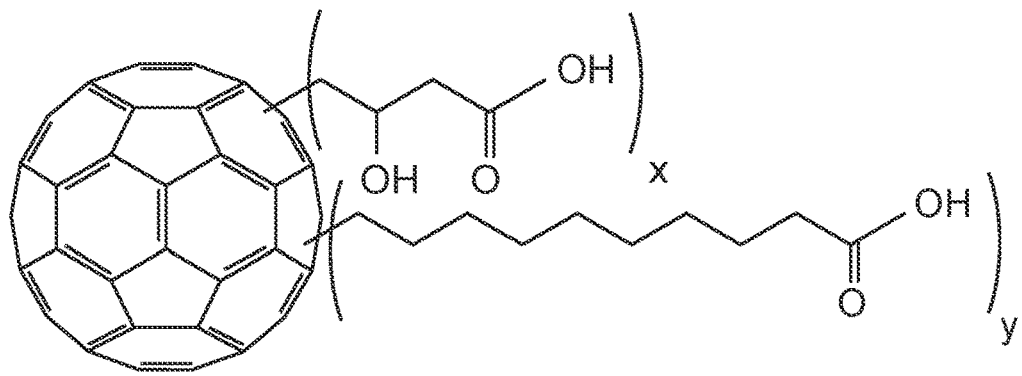
FIG. 2A shows the exemplary fullerene molecule in FIG. 2, where the carboxylic acid is C10 capric acid.
Figure 2B:
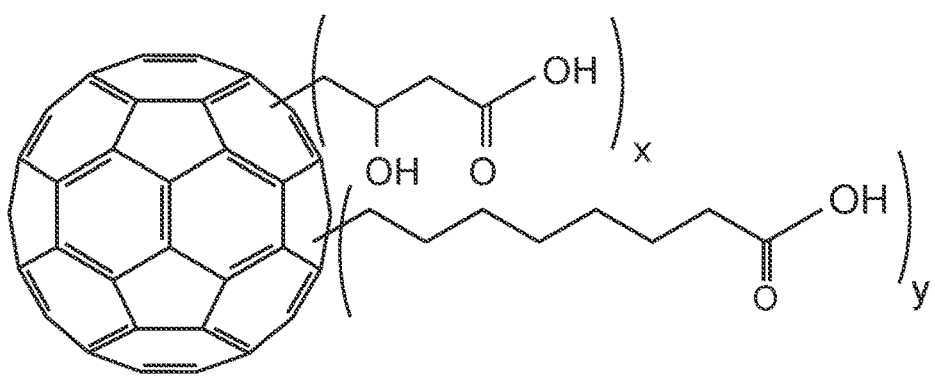
FIG. 2B shows the exemplary fullerene molecule in FIG. 2, where the carboxylic acid is C8 caprylic acid.

FIG. 2 shows an exemplary C60 fullerene molecule substituted with (x) number of beta-hydroxybutyrate groups and y number of carboxylic acids (n=0-100). The value of (x) and (y) can be anywhere between 1 and the maximum number that can be substituted on the fullerene molecule. The substitution can take place at any suitable position of the fullerene molecule. FIG. 2A shows the exemplary fullerene molecule in FIG. 2, where the carboxylic acid is C10 capric acid. FIG. 2B shows the exemplary fullerene molecule in FIG. 2, where the carboxylic acid is C8 caprylic acid.

Figure 3:
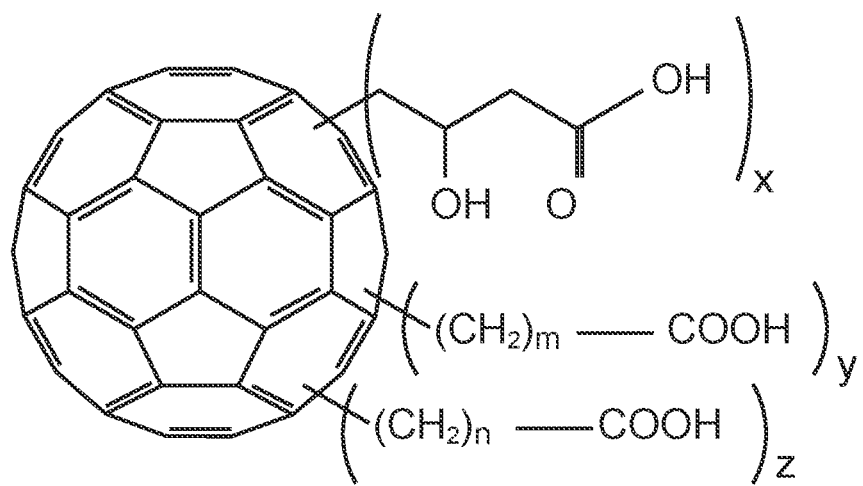
FIG. 3 shows an exemplary fullerene molecule substituted with one or more beta-hydroxybutyrate groups and one or more different carboxylic acids at any suitable position of the fullerene molecule.
Figure 3A:
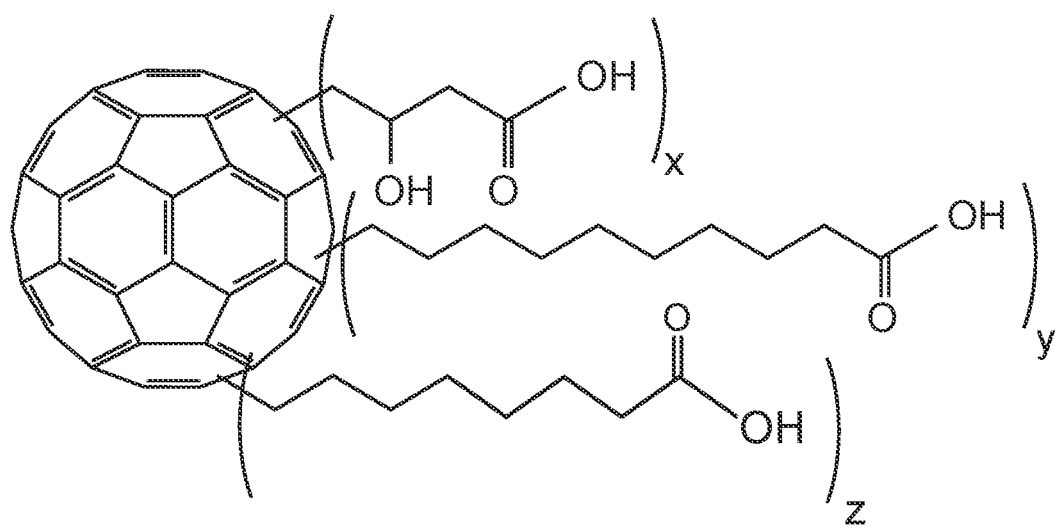
FIG. 3A shows the exemplary fullerene molecule in FIG. 3, where the carboxylic acids are C8 caprylic acid and C10 capric acid.

FIG. 3 shows an exemplary C60 fullerene molecule substituted with (x) number of beta-hydroxybutyrate groups, (y) number of carboxylic acids having (m) number of carbons (not counting the carboxy group), and (z) number of carboxylic acids having (n) number of carbons (not counting the carboxy group), where (m) is different from (n). FIG. 3A shows the exemplary fullerene molecule in FIG. 3, where the carboxylic acids are C8 caprylic acid and C10 capric acid.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The foregoing discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A nutraceutical composition, comprising a fullerene molecule substituted with a beta-hydroxybutyrate group and further covalently coupled to caprylic acid or capric acid, lecithin, and blackseed oil, wherein the fullerene molecule is C60 and free energy molecules that are not bound to the fullerene, wherein the free energy molecules comprise unbound beta-hydroxybutyrate and an unbound carboxylic acid, wherein the nutraceutical composition is formulated for oral consumption.

2. The nutraceutical composition of claim 1, wherein the beta-hydroxybutyrate group is D-beta-hydroxybutyrate.

3. The nutraceutical composition of claim 1, wherein the fullerene is covalently coupled to both caprylic acid and capric acid.

4. The nutraceutical composition of claim 1, wherein the unbound carboxylic acid is caprylic acid or capric acid.

5. The nutraceutical composition of claim 4, wherein the unbound carboxylic acid is capric acid.

6. The nutraceutical composition of claim 1, comprising two different unbound carboxylic acids not bound to the fullerene molecule.

7. The nutraceutical composition of claim 6, wherein the two unbound carboxylic acids are caprylic acid and capric acid.

8. A method of reducing free radicals, comprising administering an effective amount of the composition of claim 1 to an individual in need of treatment.

\* \* \* \* \*